United States Patent [19]
Ward

[11] 4,184,719
[45] Jan. 22, 1980

[54] MACHINE RAILS AND CARRIAGES

[76] Inventor: John D. Ward, 997 E. Athens St., Altadena, Calif. 91001

[21] Appl. No.: 915,047

[22] Filed: Jun. 12, 1978

[51] Int. Cl.² ............................................. F16C 29/02
[52] U.S. Cl. .................................. 308/3 R; 29/412; 125/14; 308/3 A; 308/6 R
[58] Field of Search .................. 308/6 R, 3 A, 3 R; 125/14; 29/412

[56] References Cited

U.S. PATENT DOCUMENTS

| 2,525,712 | 10/1950 | Neighbour | 308/6 R |
|---|---|---|---|
| 3,722,497 | 3/1973 | Hiestand et al. | 125/14 |
| 3,756,670 | 9/1973 | Harris | 308/6 R |
| 3,763,845 | 10/1973 | Hiestand et al. | 125/14 |
| 3,897,982 | 8/1975 | Teramachi | 308/6 R |

*Primary Examiner*—Douglas C. Butler
*Attorney, Agent, or Firm*—Benoit Law Corporation

[57] ABSTRACT

A rail for a machine carriage has an elongate base plate and a pair of spaced supporting walls extending along and rising obliquely from the base plate and converging toward each other in a direction away from the base plate. A first lateral carriage track is located on top of and extends along one of the supporting walls, while a second lateral carriage track is located on top of and extends along the other of the supporting walls and in parallel to the first track. An elongate top plate extends between the first and second lateral carriage tracks and is spaced from the base plate. The base plate, pair of supporting walls, first and second tracks and top plate are integral with each other and encompass an elongate hollow space extending through the rail. Apparatus for supporting and guiding a cutting machine, a machine carriage, and a method of making a machine carriage are also disclosed.

23 Claims, 7 Drawing Figures

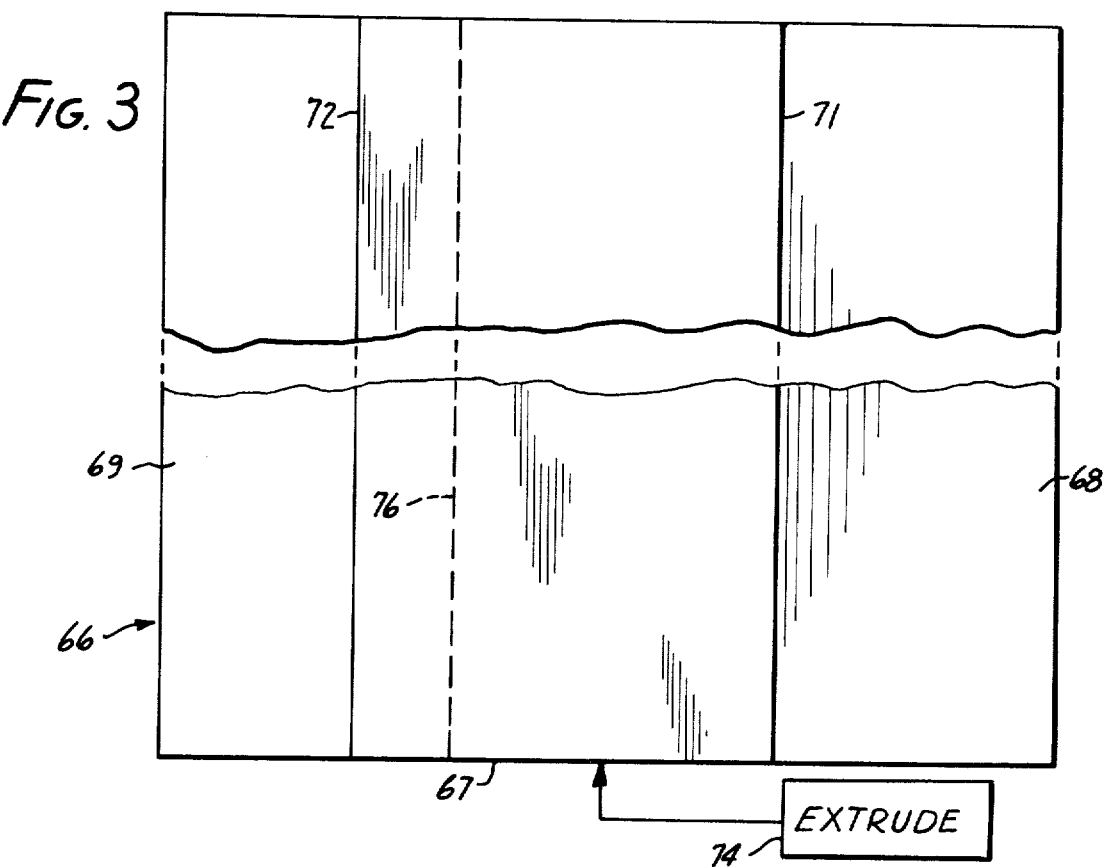
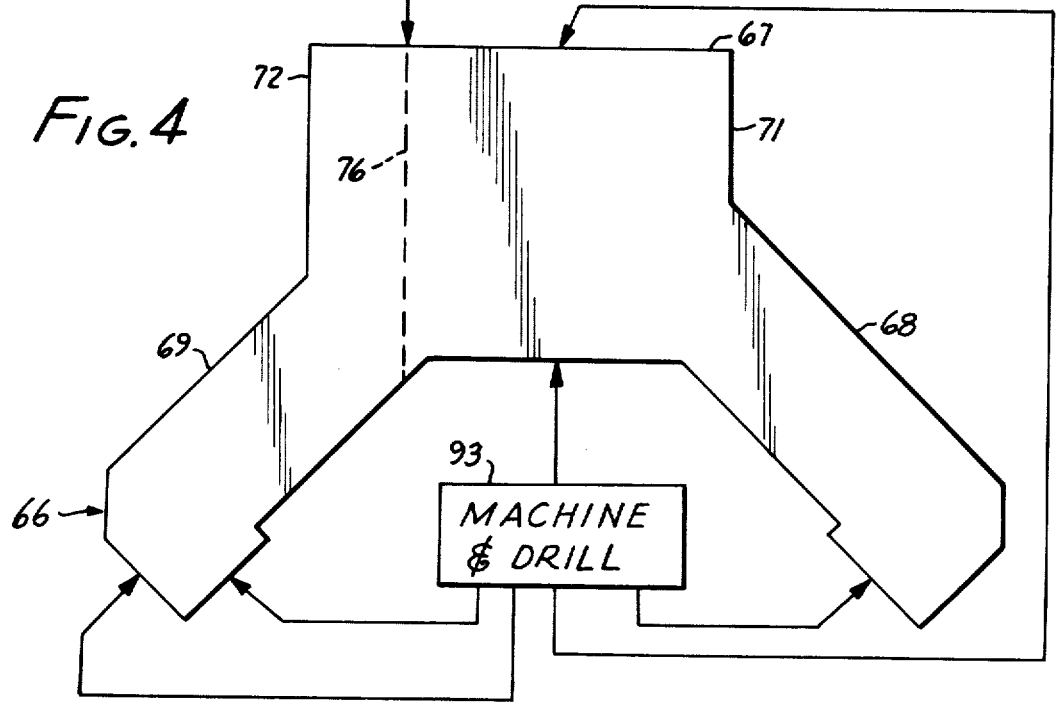

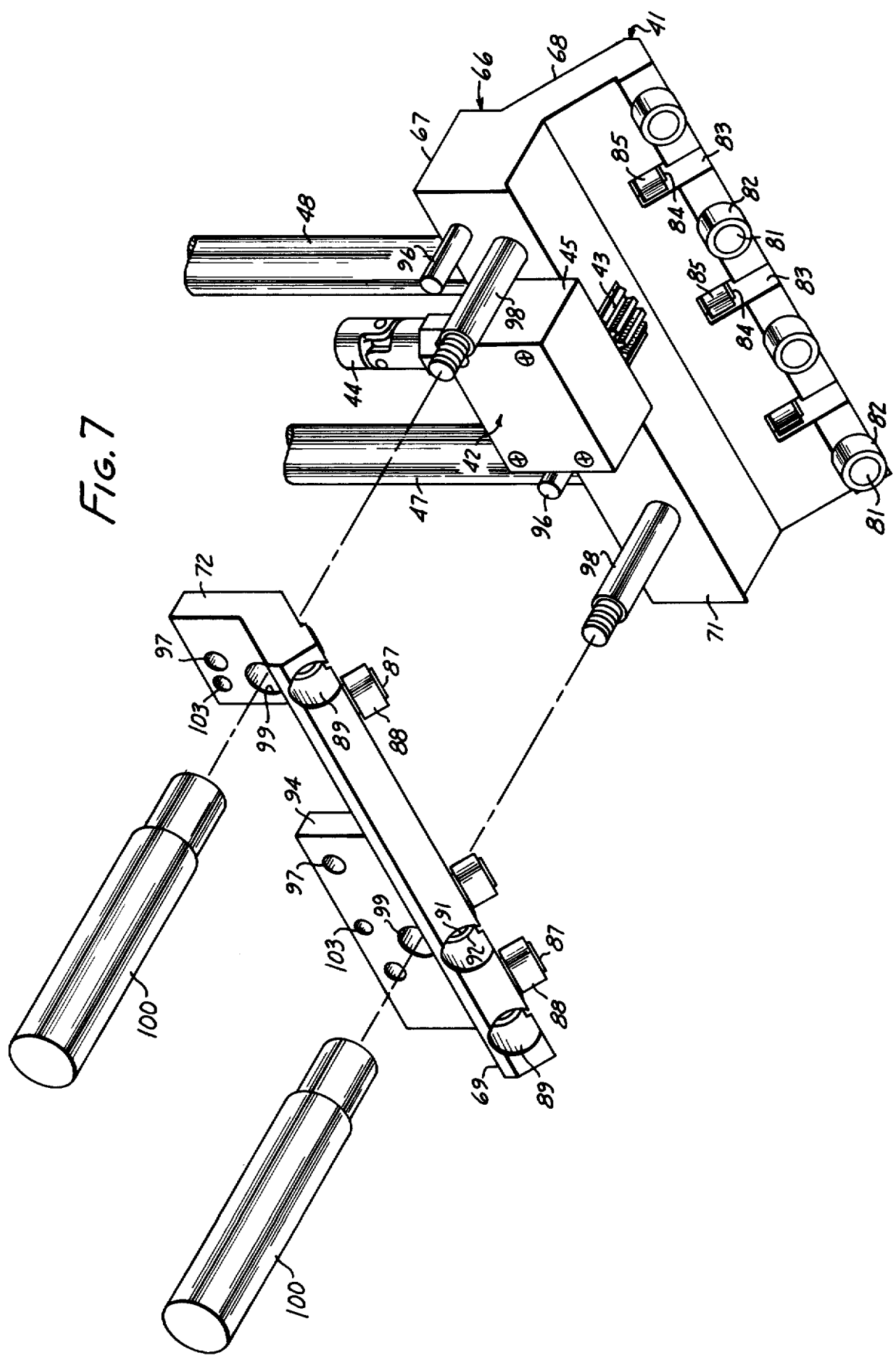

MACHINE RAILS AND CARRIAGES

BACKGROUND OF THE INVENTION

The subject invention relates to machine rails, machine carriages, methods of making a machine carriage for travel along a rail, apparatus for supporting and guiding a cutting machine, and concrete wall and floor saws.

PRIOR-ART STATEMENT

An early rail and carriage combination is apparent from U.S. Pat. No. 278,317 which discloses a rack-and-pinion arrangement with a rectangular toothed rack bar and a carriage riding therealong and friction rollers and carrying gear wheels, including a pinion meshing with the rack bar and driven by a hand crank. Equipment of this type was suitable in lifting jacks.

Adaptations of the rack-and-pinion principle found their way into the rock and concrete drilling and cutting arts, as may be seen from U.S. Pat. Nos. 1,838,459, 2,079,864, 2,502,043, 2,689,718, 3,148,001, 3,323,507, 3,378,307, 3,722,497, 3,731,821, 3,756,670, 3,763,845, 3,897,982, and 3,915,034.

Reference may also be had to U.S. Pat. No. 2,421,970 which shows the rack-and-pinion principle employed in an earth boring machine, U.S. Pat. No. 2,463,771, which shows ratchet bars, U.S. Pat. No. 3,485,306 which shows the rack-and-pinion principle applied to a tooling system having a toothed rail supported on posts, and U.S. Pat. No. 2,525,712 employing a hollow square bar as a supporting guide for machine tool elements.

Despite these prior-art efforts spanning nearly a century, there persists a need for rails for machine carriages characterized by superior rigiditiy and structural stability, as well as for corresponding machine carriages, for improved methods of making machine carriages, for apparatus for supporting and guiding cutting machines, and for improved equipment and machinery employing such machine rails and carriages.

SUMMARY OF THE INVENTION

It is a principal object of the subject invention to satisfy the above mentioned needs and overcome disadvantages of prior-art apparatus and methods.

It is a related object of this invention to provide improved rails for machine carriages.

It is a germane object of this invention to provide improved apparatus for supporting and guiding a cutting machine.

It is also an object of this invention to provide an improved machine carriage for advancing machine parts relative to carriage track means.

It is a related object of this invention to provide improved methods of making machine carriages.

It is also an object of this invention to provide equipment and machines employing the improved rails and carriages of the subject invention.

It is a related object of this invention to provide improved concrete wall and floor saws.

Other objects of the invention will become apparent in the further course of this disclosure.

From one aspect thereof, the subject invention resides in a rail for a machine carriage, comprising in combination an elongate base plate, a pair of spaced supporting walls extending along and rising obliquely from the base plate and converging toward each other in a direction away from the base plate, first lateral carriage track means located on top of and extending along one of the supporting walls, second lateral carriage track means located on top of and extending along the other of the supporting walls, and extending in parallel to the first track means, and an elongate top plate extending between the first and second lateral carriage track means and being spaced from the base plate. The base plate, pair of supporting walls, first and second track means and top plate being integral with each other and encompassing an elongate hollow space extending through the rail. In accordance with a preferred embodiment of the subject invention, the rail just defined includes a rack extending along the top plate.

In accordance with a preferred embodiment of the subject invention, the first carriage track means and one of the supporting walls constitute a first zigzag profile structure integral with and extending between the elongate base plate and the elongate top plate. The second carriage track means and the other of the supporting walls constitute the second zigzag profile structure integral with and extending between the elongate base plate and the elongate top plate with the second zigzag profile structure being spaced from, and in the form of a mirror image of, the first zigzag profile structure.

From another aspect thereof, the invention resides in apparatus for supporting and guiding a cutting machine, comprising in combination a machine carriage for mounting the cutting machine, a rail for the machine carriage including an elongate base plate, a pair of spaced supporting walls extending along and rising obliquely from the base plate and converting towards each other in a direction away from the base plate, first lateral track means for the carriage located on top of and extending along one of the supporting walls, second lateral track means for the carriage located on top of and extending along the other of the supporting walls, and extending in parallel to the first track means, an elongate top plate extending between the first and second lateral carriage track means and being spaced from the base plate, and a toothed rack on the top plate. The base plate, pair of supporting walls, first and second track means and top plate being integral with each other and encompassing an elongate hollow space extending through the rail. The carriage includes means for propelling the carriage along the rail, and the propelling means includes a pinion meshing with the toothed rack.

From another aspect thereof, the invention resides in a method of making a machine carriage for travel along a rail having a pair of lateral carriage track means. The invention according to this aspect resides, more specifically, in the improvement comprising in combination the steps of extruding a structure having an elongate block and elongate side walls extending from said block in an inverted V-shaped configuration to at least partially straddle said pair of lateral carriage track means, cutting said structure into two parts at least through said elongate block, providing said elongate side walls with means for riding along the lateral carriage track means, providing one of said parts with means for attaching machine components, and releasably reuniting said two parts of the cut structure.

The subject invention also resides in a machine carriage for advancing machine parts relative to a pair of lateral carriage track means, made by a method comprising in combination the steps of extruding a structure having an elongate block and elongate side walls extending from said block in an inverted V-shaped configuration to at least partially straddle said pair of lateral carriage track means, cutting said structure into two parts at least through said elongate block, providing said elongate side walls with means for riding along said lateral carriage track means, providing one of said parts with means for attaching machine components, and releasably reuniting said two parts of said cut structure.

From another aspect thereof, the subject invention resides also in a machine carriage for advancing machine parts relative to a pair of lateral carriage track means, comprising in combination a carriage body made by a method including the steps of extruding a structure having an elongate block and elongate side walls extending from said block in an inverted V-shaped configuration to at least partially straddle said pair of lateral carriage track means, and cutting said structure into two parts at least through said elongate block, means on said side walls for riding along said lateral carriage track means, means on one of said parts for attaching machine components, and means coupled to said parts for releasably reuniting said two parts of said cut structure.

BRIEF DESCRIPTION OF THE DRAWINGS

The invention and its objects and aspects will become more readily apparent from the following detailed description of preferred embodiments thereof, illustrated by way of example in the accompanying drawings, in which like embodiments designate like or functionally equivalent parts, and in which:

FIG. 3 is a foreshortened view of an extrusion and a diagrammatic showing of an extrusion process useful in a method for making a machine carriage in accordance to a preferred embodiment of the subject invention;

FIG. 4 is an end view of the extrusion of FIG. 1 and a diagrammatic showing of a manufacturing process useful in the machine carriage making method according to a preferred embodiment of the subject invention;

FIG. 7 is a perspective view of a machine carriage according to a preferred embodiment of the subject invention.

DESCRIPTION OF PREFERRED EMBODIMENTS

Figure 1:
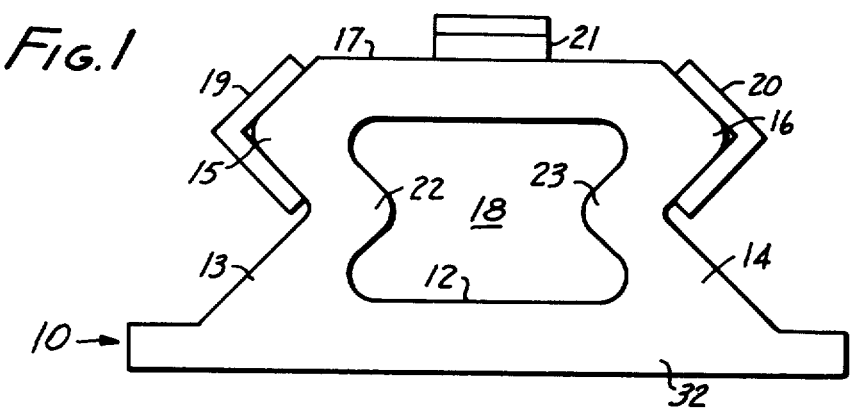
FIG. 1 is an end view of a rail structure according to a preferred embodiment of the subject invention.

The rail 10 according to the preferred embodiment of the subject invention shown in FIG. 1 is suitable for guiding a machine carriage for travel therealong.

Figure 6:
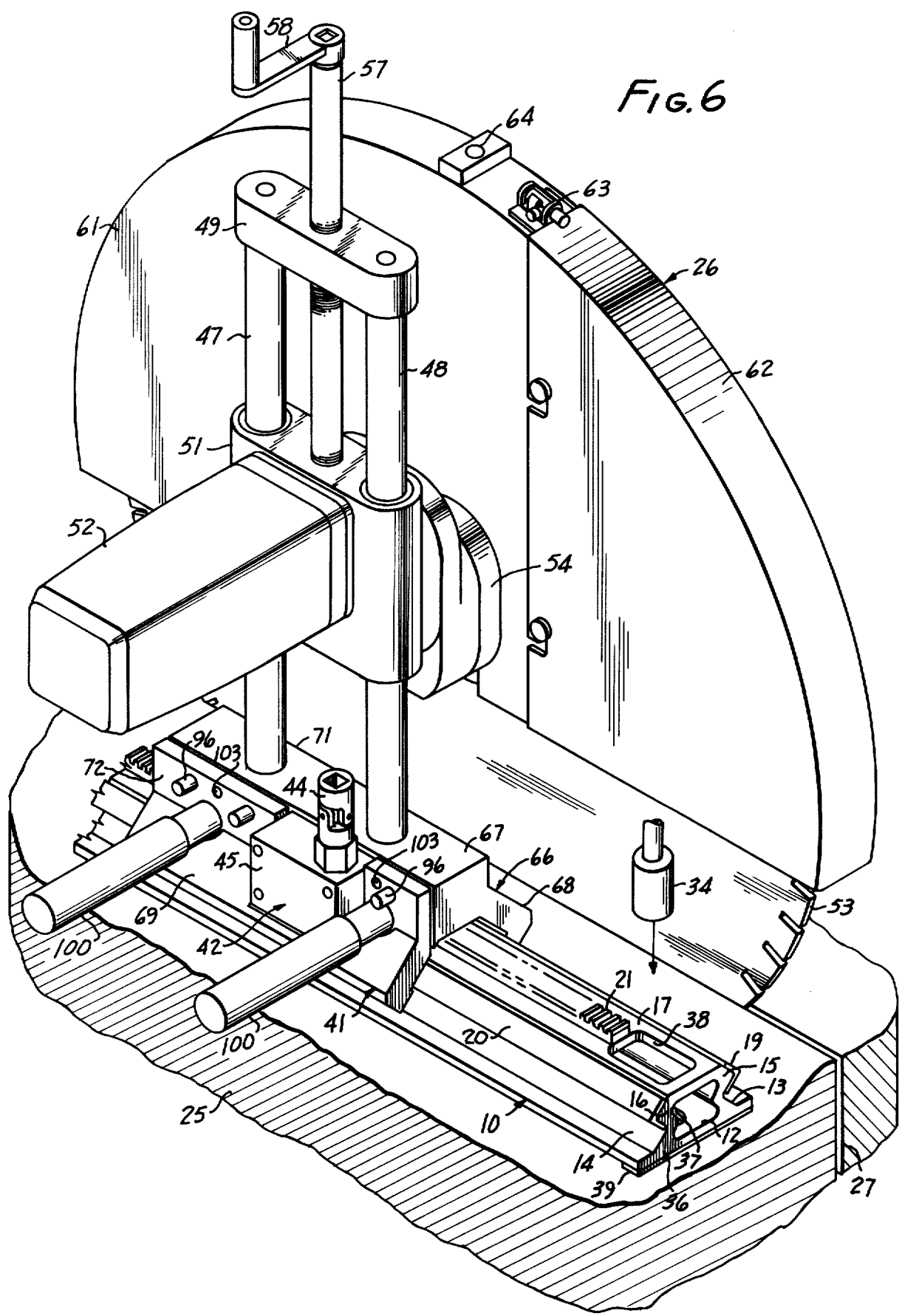
FIG. 6 is a perspective view of apparatus for supporting and guiding a concrete wall saw, and of a concrete wall saw, according to a preferred embodiment of the subject invention.

As apparent from FIGS. 1 and 6, the rail 10 has an elongate base plate 12 and a pair of spaced supporting walls 13 and 14 extending along and rising obliquely from the base plate and converging toward each other in a direction away from the base plate. First lateral carriage track means 15 are located on top of and extend along one of the supporting walls, namely the supporting wall 13 in the embodiment shown in FIGS. 1 and 6. Second lateral carriage track means 16 are located on top of and extend along the other of the supporting walls, namely along the supporting wall 14 in the illustrated preferred embodiment.

An elongate top plate 17 extends between the first and second lateral carriage track means 15 and 16 and is spaced from the base plate 12. This base plate, pair of supporting walls 13 and 14, first and second track means 15 and 16, and top plate 17 are integral with each other and encompasses an elongate hollow space 18 extending through the rail 10.

The first and second lateral carriage track means 15 and 16 extend parallel to the elongate base plate 12 in the illustrated preferred embodiment. The first lateral carriage track is clad with a first angle iron 19 and the second lateral carriage track is clad with a second angle iron 20. Also in the illustrated preferred embodiment of the subject invention, a rack 21 extends along the top plate 17.

As apparent from FIGS. 1 and 6, the first carriage track means 15 and one of the supporting walls, namely the supporting wall 13, constitute a first zigzag profile structure 22 integral with and extending between the elongate base plate 12 and the elongate top plate 17. Similarly, the second carriage track means 16 and the other of the supporting walls, namely the supporting wall 14, constitute a second zigzag profile structure 23 integral with and extending between the elongate base plate 12 and the elongate top plate 17. The second zigzag profile structure 23 is spaced from, and in the form of a mirror image of, the first zigzag profile structure 22. In other words, the zigzag profile structures 22 and 23 are spaced from, and mirror images of, each other.

In practice, the teachings of the subject invention have resulted in very rigid and stable rail structures which are particularly suited for supporting and guiding strongly vibrating equipment subject to rough handling.

As shown in FIG. 6, the rail 10 may be attached to a structure, such as a concrete floor or wall 25 with respect to which machinery is to be supported and guided by the rail 10. In the illustrated preferred embodiment of FIG. 6, the machinery in question is a concrete wall saw 26 for cutting a slot 27 or an aperture into the wall 25.

Figure 2:
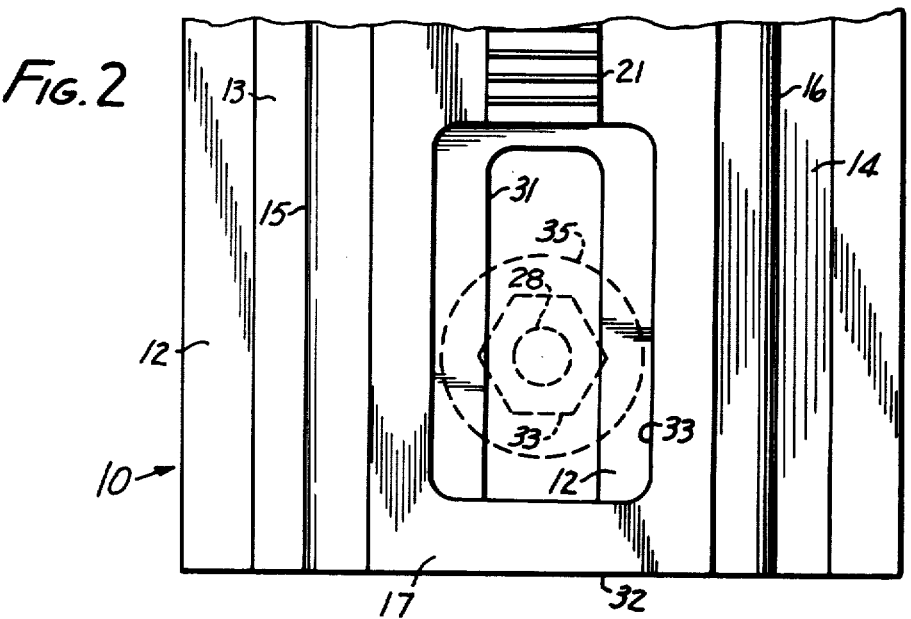
FIG. 2 is a partial top view of a rail structure according to FIG. 1.

In accordance with conventional practice, the rail 10 is preferably attached to the structure 25 by a pair of bolts, one of which is seen at 28 in FIG. 2. These bolts are attached to the structure 25, such as by cementing in the case of concrete walls.

For instance, a hole may be drilled into the wall 25 at each location where an anchor bolt is desired, and a bolt 28 may then be cemented in each predrilled hole.

As shown in FIG. 2, the elongate base plate 12 of the rail 10 has a first aperture 31 adjacent one end 32 thereof for receiving rail fastening means, including the anchor bolt 28. The top plate 17 has a second aperture 33 registering with the first aperture 31 for receiving a tool for actuating the fastening means. For instance, the aperture 33 is wide enough to receive a socket wrench 34 for tightening a nut on the threaded end of the anchor bolt 28. A washer 35 may be interposed between the apertured base plate 12 and the nut 33 so that the rail 11 is clamped down on the wall 25 when the nut 33 is tightened on the bolt 28.

As seen in FIGS. 2 and 6, the rail 10, according to the illustrated preferred embodiment, actually has two sets of apertures, one set being shown in FIG. 2 adjacent a first end 32, and the other set being shown in FIG. 6 adjacent a second end 36 of the rail 10.

In particular, and by way of partial recapitulation, the base plate 12 of the rail 10 has a first aperture 31 adjacent one end 32 thereof for receiving first rail fastening means 28. The top plate 17 has a second aperture 33 registering with the first aperture 31 for receiving a tool for actuating the first fastening means. As shown in FIG. 6, the elongate base plate 12 has a third aperture 37 adjacent the other end 36 thereof for receiving second rail fastening means (see 28 in FIG. 2).

The top plate 17 has a fourth aperture 38 registering with the third aperture 37 for receiving a tool 34 for actuating the second rail fastening means. While the second rail fastening means are not visible in FIG. 6 they may be identical to the first fastening means 28, 33 and 35.

As an important feature of the illustrated preferred embodiment of the subject invention, the first and second lateral carriage tracks 15 and 16 and their angle irons 19 and 20 extend from end to end 32 and 36 along the rail. In practice, this permits full utilization of the entire length of the rail 10 without any limitation in carriage travel due to anchor bolts or other rail fastening means. In particular, since the anchor bolt 28 may be entirely sunk or concealed within the confines of the cross-section of the rail due to the rail construction shown in FIGS. 1, 2 and 6, there are no protruding bolts or other fastening means which would impede the free travel of the carriage from end to end of the rail 10. Moreover, two or more of the rails 10 may be aligned with each other to permit travel of the machine carriage over two or more rails for an extended operation of the concrete saw or other equipment supported by the carriage.

The toothed rack 21, on the other hand, need not extend from end to end of the rail 10, but need only extend on the top plate 17 between the second and fourth apertures 33 and 38, as seen in FIGS. 2 and 6. Since the carriage pinion that meshes with the rack 21 is spaced from either end of the carriage, the carriage itself can still be driven from end to end of the rail 10 even though the rack 21 extends only between the apertures 33 and 38.

In principle, the rack 21, as well as the track faces 19 and 20, could be integral with the body of the rail 10. However, since the rail 10 is preferably an extrusion of aluminum or an aluminum alloy, the track angles 19 and 20 and the rack 21 are preferably made of a harder material, such as iron or steel. In that case, the parts 19 to 21 may be attached to the body of the rail 10 by screws or other fasteners (not shown) or by a strong and durable industrial adhesive.

In practice, the rail 10 may be directly applied to the wall 25 or other object to be cut. If desired, spacers may, however, be provided between the rail 10 and the surface of the structure 25 as shown, by way of example, at 39 in FIG. 6.

The apparatus according to the preferred embodiment of the subject invention shown in FIG. 6 for supporting and guiding a concrete wall saw 26 or other cutting machine comprises the above mentioned rail 10 and a carriage 41 including means 42 for propelling the carriage along the rail 10. As seen in FIG. 7, these propelling means 42 include a pinion 43 which meshes with the toothed rack 21 when the carriage is riding on the rail 10. In accordance with conventional practice, the pinion 43 may be driven by a hand crank (not shown) having an end thereof inserted in a universal joint 44.

This rotating universal joint drives the pinion 43 through gearing located in a gear box 45.

The carriage 41 has attached thereto a pair of upright guiding posts or stanchions 47 and 48 having a bar 49 attached to the upper ends thereof.

A second carriage 51 rides along the stanchions 47 and 48. A motor 52 for rotating a saw blade or different cutting tool 53 is attached to the second carriage 51 which also mounts gearing and bearing means 54 for the rotary blade 53. The space of the second carriage 51 relative to the first carriage 41, or the vertical or perpendicular position of the rotary blade 53 relative to the structure 25 to be or being cut, is adjusted by means of a lead screw 57 which is rotated by a hand crank 58, extends through a threaded aperture in the cross bar 49 and is rotatably attached to the second carriage 51.

The second carriage 51 thus operates as a blade carriage, while the first carriage 41 may be considered a track carriage. The blade 53 may be diamond tipped and may be partially enclosed by a cover having a first portion attached to the blade carriage 51 via the gearing and bearing means 54 and a second portion 62 releasably attached to the first portion by a manually actuable fastening and release mechanism 63. The cover 61, moreover, is provided with an apertured nipple 64 for receiving a hose or other conduit by means of which water or another coolant may be supplied to the cutting blade in a conventional manner.

As seen in FIGS. 6 and 7, the machine carriage 41 for advancing machine parts relative to a pair of lateral carriage tracks 15 and 16 or 19 and 20 has a carriage body 66 including a bipartite elongate block 67 and elongate side walls 68 and 69 extending from the bipartite block 67 in an inverted V-shaped configuration to at least partially straddle the pair of lateral carriage track means 15 and 16 or 19 and 20.

The bipartite block 67 consists of two parts 71 and 72. The stanchions 47 and 48 attached to the track carriage part 71 and the blade carriage 51 riding on the stanchions 47 and 48 constitute means on one of the parts 71 and 72 for attaching machine components, such as the motor 52 and the blade 53 with gearing and bearing means 54.

Figure 5:
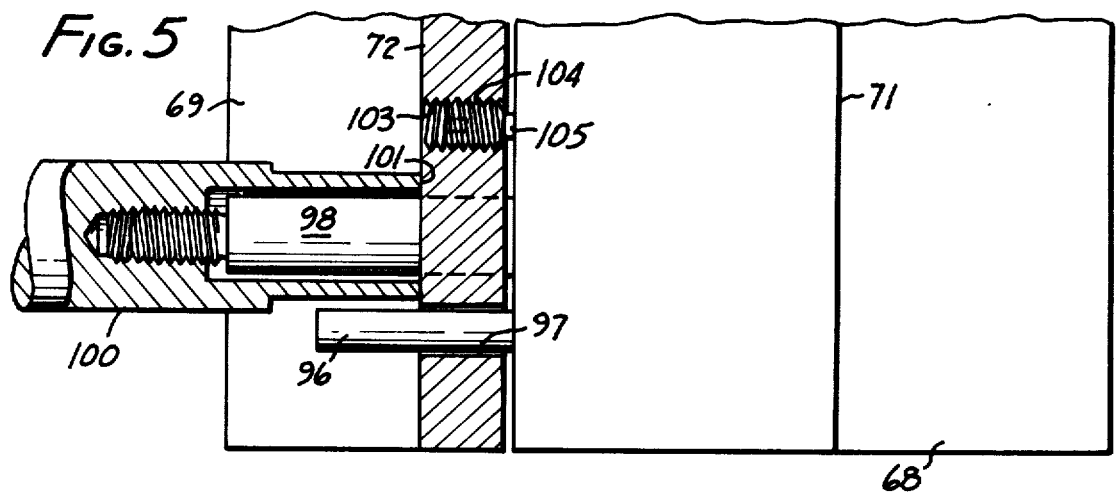
FIG. 5 is a partial top view, partially in section, of a machine carriage according to a preferred embodiment of the subject invention.

A method of making the machine carriage in accordance with a preferred embodiment of the subject invention is shown in FIGS. 3 and 4 with the aid of FIGS. 5, 6 and 7.

In particular, according to FIGS. 3 and 4, a method of making a machine carriage for travel along a rail having a pair of lateral carriage track means includes the step of extruding a structure 66 having an elongate block 67 and elongate side walls 68 and 69 extending from the block 67 in an inverted V-shaped configuration to at least partially straddle the pair of lateral carriage tracks 15 and 16 or 19 and 20.

A block 74 in FIG. 4 indicates an extruding process for making the extrusion shown in FIGS. 4 and 5. Such extruding processes are well known in practice as such. By way of example, and not by way of limitation, the structure 66 may be an aluminum or aluminum alloy extrusion.

Further in accordance with the preferred embodiment illustrated in FIGS. 3 and 4, and as indicated by the block 75, the structure 66 is cut into two parts 71 and 72 at least through the elongate block 67, as indicated by the dotted line 76.

As seen in FIG. 4, the configuration of the extruded structure 66 may be asymmetrical, and the cut 76 may extend asymmetrically so that the one carriage part 71 is larger than the other carriage part 72. As already mentioned above with reference to FIGS. 6 and 7, the stanchions 47 and 48 for attaching machine parts 51 to 54 are located on the larger carriage part 71. The stanchions 47 and 48 may be attached to the carriage part 71 by welding, threading or any other suitable fastening method or means.

The side walls 68 and 69 of the track carriage 41 are provided with means for riding along the lateral carriage tracks 15 and 16 or 19 and 20. In particular, the side wall 68 of the carriage part 71 has shafts 81 attached thereto. Rollers 82 are rotatably disposed on these shafts 81 and, for example, ride along the lower face or track surface of the angle iron 19 seen in FIG. 6. The carriage side wall 68 also has bores 83 in which shafts 84 attached to the side wall 68 and rollers 85 rotatable on the shafts 84 are located. The rollers 85 are disposed to ride on the upper face or track surface of the track 19, for example.

The carriage part 72 has shafts 87 attached thereto which rotatably carry rollers 88. The shafts 87 on the carriage part 72 correspond to the shafts 81 on the part 71, and the rollers 88 correspond to the rollers 82 and are positioned to ride, for instance, along the lower face or track surface of the angle iron 20. Similarly, the carriage part 72 has bores 89 corresponding to the bores 83 in the part 71 and containing shafts 91 and rollers 92 corresponding to the shafts 84 and rollers 85 of the part 71.

The rollers 92 are, for instance, positioned to ride along the upper face or track surface of the angle iron 20.

A block 93 in FIG. 4 indicates a machining and drilling operation including the step of drilling the holes 83 and 89 as well as the requisite holes for the shafts 81, 84, 87 and 91.

As shown in FIG. 7, one of the carriage parts, such as the carriage part 71, is provided with the previously described means 42 to 45 for propelling the carriage 41 along the rail 10 or its track means. In practice, this may be implemented by providing a bore for receiving the pinion 43 in the carriage part 71 and by attaching the gear box 45 to that carriage part with the aid of screws or other suitable fasteners. An opening 94 is cut into the carriage part 72 to accommodate the gear box 75 when the parts 71 and 72 are releasably reunited.

As shown in FIGS. 5 to 7, the parts 71 and 72 of the cut structure 66 are releasably united by means coupled to these carriage parts 71 and 72.

In particular, the carriage part 71 is provided with alignment pins 96 which enter corresponding alignment apertures 97 in the carriage part 72.

The carriage part 71 also has threaded stems or shafts 98 attached thereto. The carriage part 72 has corresponding apertures 99 so that it may ride along the shafts 98.

Internally threaded handles 100 cooperate with the thread shafts 98 for maintaining the carriage parts 71 and 72 in a releasably reunited relationship on the rail 10, as shown in FIG. 6.

As apparent from FIG. 5, each handle 100 is threaded on a shaft 98 and has a facing portion abutting against the carriage part 72 for retention thereof adjacent the carriage part 71.

In accordance with a further preferred embodiment of the subject invention, the two carriage parts 71 and 72 are controllably spaced from each other for adjusting the riding means or rollers 82, 85, 88 and 92 relative to the carriage track means 19 and 20. In particular, the carriage part 72 has threaded bores 103 for receiving adjustable stop means in the form of Allen screws 104 or other threaded devices. Each screw 104 has a stop or tip 105 engaging the carriage part 71 for controllably spacing the two cut parts 71 and 72 from each other upon rotation of the screws 104 in their corresponding threaded holes 103. The method of the subject invention herein disclosed produces a machine carriage 41 which, in accordance with a preferred embodiment of the subject invention, is greatly superior to existing carriages in terms of attainable precision and performance relative to requisite cost and effort of manufacture. The same applies in practice to the rail 10 of the subject invention.

In addition, the combination of rail 10 and track carriage 41 shown in FIG. 6 results in tracking apparatus that are not only more precise, rugged and rigid than existing equipment, but also less expensive and easier to manufacture than machinery of comparable performance.

While specific embodiments have been herein disclosed, various modifications and variations within the spirit and scope of the subject invention will become apparent or suggest themselves to those skilled in the art on the basis of the subject extensive disclosure.

I claim:

1. A rail for a machine carriage, comprising in combination:
    an elongate base plate;
    a pair of spaced supporting walls extending along and rising obliquely from said base plate and converging toward each other in a direction away from said base plate;
    first lateral carriage track means located on top of and extending along one of said supporting walls;
    second lateral carriage track means located on top of and extending along the other of said supporting walls, and extending in parallel to said first track means; and
    an elongate top plate extending between said first and second lateral carriage track means and being spaced from said base plate;
    said base plate, pair of supporting walls, first and second track means and top plate being integral with each other and encompassing an elongate hollow space extending through said rail.

2. A rail as claimed in claim 1, wherein:
    said elongate base plate has a first aperture adjacent one end thereof for receiving rail fastening means; and
    said top plate has a second aperture registering with said first aperture for receiving a tool for actuating said fastening means.

3. A rail as claimed in claim 1, wherein:
    said elongate base plate has a first aperture adjacent one end thereof for receiving first rail fastening means;
    said top plate has a second aperture registering with said first aperture for receiving a tool for actuating said first fastening means;
    said elongate base plate has a third aperture adjacent the other end thereof for receiving second rail fastening means; and
    said top plate has a fourth aperture registering with said third aperture for receiving a tool for actuating said second rail fastening means.

4. A rail as claimed in claim 1, including:
a rack extending along said top plate.

5. A rail as claimed in claim 1, wherein:
said elongate base plate has a first aperture adjacent one end thereof for receiving rail fastening means;
said top plate has a second aperture registering with said first aperture for receiving a tool for actuating said fastening means;
said rail includes a toothed rack extending along said top plate from said second aperture; and
said first and second lateral carriage track means extend from end to end along said rail.

6. A rail as claimed in claim 1, wherein:
said elongate base plate has a first aperture adjacent one end thereof for receiving first rail fastening means;
said top plate has a second aperture registering with said first aperture for receiving a tool for actuating said first fastening means;
said elongate base plate has a third aperture adjacent the other end thereof for receiving second rail fastening means;
said top plate has a fourth aperture registering with said third aperture for receiving a tool for actuating said second rail fastening means;
said rail includes a toothed rack extending on said top plate between said second and fourth apertures; and
said first and second carriage track means extend from end to end along said rail.

7. A rail as claimed in claim 1, wherein:
said first and second lateral carriage track means extend parallel to said elongate base plate.

8. A rail as claimed in claim 1, 2, 3, 4, 5, 6 or 7, wherein:
said first lateral carriage track is clad with a first angle iron; and
said second lateral carriage track is clad with a second angle iron.

9. A rail as claimed in claim 1, 2, 3, 4, 5, 6 or 7 wherein:
said first carriage track means and one of said supporting walls constitute a first zigzag profile structure integral with and extending between said elongate base plate and said elongate top plate; and
said second carriage track means and the other of said supporting walls constitute a second zigzag profile structure integral with and extending between said elongate base plate and said elongate top plate, with said second zigzag profile structure being spaced from, and in the form of a mirror image of, said first zigzag profile structure.

10. Apparatus for supporting and guiding a cutting machine, comprising in combination:
a machine carriage for mounting said cutting machine;
a rail for said machine carriage, including:
an elongate base plate;
a pair of spaced supporting walls extending along and rising obliquely from said base plate and converging toward each other in a direction away from said base plate;
first lateral track means for said carriage located on top of and extending along one of said supporting walls;
second lateral track means for said carriage located on top of and extending along the other of said supporting walls, and extending in parallel to said first track means;
an elongate top plate extending between said first and second lateral carriage track means and being spaced from said base plate; and
a toothed rack on said top plate;
said base plate, pair of supporting walls, first and second track means and top plate being integral with each other and encompassing an elongate hollow space extending through said rail; and
said carriage including means for propelling said carriage along said rail, said propelling means including a pinion meshing with said toothed rack.

11. Apparatus as claimed in claim 10, wherein:
said elongate base plate has a first aperture adjacent one end thereof for receiving rail fastening means inside said rail and out of the path of said carriage; and
said top plate has a second aperture registering with said first aperture for receiving a tool for actuating said fastening means.

12. Apparatus as claimed in claim 10, wherein:
said elongate base plate has a first aperture adjacent one end thereof for receiving first rail fastening means inside said rail and out of the path of said carriage;
said top plate has a second aperture registering with said first aperture for receiving a tool for actuating said first fastening means;
said elongate base plate has a third aperture adjacent the other end thereof for receiving second rail fastening means inside said rail and out of the path of said carriage; and
said top plate has a fourth aperture registering with said third aperture for receiving a tool for actuating said second rail fastening means.

13. Apparatus as claimed in claim 11 or 12, wherein:
said first and second lateral carriage track means extend from end to end along said rail for a propulsion of said carriage from end to end along said rail.

14. Apparatus as claimed in claim 10, wherein:
said first and second lateral carriage track means extend parallel to said elongate base plate.

15. Apparatus as claimed in claim 10, 11 or 12, wherein:
said first carriage track means and one of said supporting walls constitute a first zigzag profile structure integral with and extending between said elongate base plate and said elongate top plate; and
said second carriage track means and the other of said supporting walls constitute a second zigzag profile structure integral with and extending between said elongate base plate and said elongate top plate, with said second zigzag profile structure being spaced from, and in the form of a mirror image of, said first zigzag profile structure.

16. In a method of making a machine carriage for travel along a rail having a pair of lateral carriage track means, the improvement comprising in combination the steps of:
extruding a structure having an elongate block and elongate side walls extending from said block in an inverted V-shaped configuration to at least partially straddle said pair of lateral carriage track means;
cutting said structure into two parts at least through said elongate block;

providing said elongate side walls with means for riding along said lateral carriage track means;

providing one of said parts with means for attaching machine components; and releasably reuniting said two parts of said cut structure.

17. A method as claimed in claim 16, including the step of:

controllably spacing said two parts from each other for adjusting said riding means relative to said carriage track means.

18. A method as claimed in claim 16 or 17, including the step of:

providing one of said parts with means for propelling said carriage along said track means.

19. A machine carriage for advancing machine parts relative to a pair of lateral carriage track means, made by a method comprising in combination the steps of:

extruding a structure having an elongate block and elongate side walls extending from said block in an inverted V-shaped configuration to at least partially straddle said pair of lateral carriage track means;

cutting said structure into two parts at least through said elongate block;

providing said elongate side walls with means for riding along said lateral carriage track means;

providing one of said parts with means for attaching machine components; and releasably reuniting said two parts of said cut structure.

20. A machine carriage for advancing machine parts relative to a pair of lateral carriage track means, comprising in combination:

a carriage body made by a method including the steps of extruding a structure having an elongate block and elongate side walls extending from said block in an inverted V-shaped configuration to at least partially straddle said pair of lateral carriage track means, and cutting said structure into two parts at least through said elongate block;

means on said side walls for riding along said lateral carriage track means;

means on one of said parts for attaching machine components; and means coupled to said parts for releasably reuniting said two parts of said cut structure.

21. A machine carriage as claimed in claim 20, including:

means on at least one of said cut parts for controllably spacing said two cut parts from each other for adjusting said riding means relative to said carriage track means.

22. A machine carriage as claimed in claim 20, including:

adjustable stop means located on the other of said cut parts and engaging said one cut part for varying the spacing between said two cut parts.

23. A machine carriage as claimed in claim 20, including:

means on one of said parts for propelling said carriage along said track means.

* * * * *